United States Patent
Park et al.

(10) Patent No.: US 6,396,957 B1
(45) Date of Patent: May 28, 2002

(54) METHOD AND APPARATUS FOR GENERATING A BOUNDING RECTANGLE OF A VOP FOR INTERLACED SCAN TYPE VIDEO SIGNALS

(75) Inventors: Cheol Soo Park, Kyonggi-do; Joo Hee Moon, Seoul; Hae Kwang Kim, Seoul; Jong Deuk Kim, Seoul, all of (KR)

(73) Assignee: Hyundai Electronics Industries Co., Ltd., Kyongki-do (KR)

(*) Notice: Subject to any disclaimer, the term of this patent is extended or adjusted under 35 U.S.C. 154(b) by 0 days.

(21) Appl. No.: 09/265,799

(22) Filed: Mar. 10, 1999

(30) Foreign Application Priority Data

Mar. 10, 1998 (KR) .............................................. 98-7977
Feb. 10, 1999 (KR) .............................................. 99-4675

(51) Int. Cl.$^7$ ................................................. G06K 9/36
(52) U.S. Cl. ................... 382/243; 382/241; 375/240.09
(58) Field of Search ................................ 382/232, 236, 382/239, 243, 241; 348/416.1, 419.1, 699; 375/240.01, 240.08, 240.16, 240.09

(56) References Cited

U.S. PATENT DOCUMENTS

| | | | | |
|---|---|---|---|---|
| 5,822,460 A | * | 10/1998 | Kim | 382/243 |
| 6,005,980 A | * | 12/1999 | Eifrig et al. | 382/236 |
| 6,026,195 A | * | 2/2000 | Eifrig et al. | 382/236 |
| 6,057,884 A | * | 5/2000 | Chen et al. | 348/416 |
| 6,097,842 A | * | 8/2000 | Suzuki et al. | 382/232 |
| 6,198,768 B1 | * | 3/2001 | Yamaguchi et al. | 375/240.01 |

FOREIGN PATENT DOCUMENTS

EP 0806871 11/1997

* cited by examiner

Primary Examiner—Jon Chang
Assistant Examiner—Jingge Wu
(74) Attorney, Agent, or Firm—Blank Rome Comisky & McCauley LLP

(57) ABSTRACT

A method and apparatus for generating a bounding rectangle of a VOP for interlaced scan type video signals, which are capable of accurately generating a bounding rectangle, thereby preventing a color bleeding from occurring in the field-based chrominance shape subsampling. The method includes bounding rectangle formation step of forming a bounding rectangle of a video object plane in such a fashion that the bounding rectangle contains an object therein, based on input luminance shape information, optimum setting determination step of determining whether or not a spatial reference point of the bounding rectangle is positioned on an x-y coordinate of coordinate value (2m, 4n) (m and n=0, 1, 2, 3, 4, . . . ), and bounding rectangle adjustment step of varying the bounding rectangle, when it is determined at the optimum setting determination step that the spatial reference point of the bounding rectangle is not positioned on the x-y coordinate of coordinate value (2m, 4n), in such a fashion that the spatial reference point of the bounding rectangle is positioned on an x-y coordinate of coordinate value (2m, 4n).

7 Claims, 7 Drawing Sheets

METHOD AND APPARATUS FOR GENERATING A BOUNDING RECTANGLE OF A VOP FOR INTERLACED SCAN TYPE VIDEO SIGNALS

BACKGROUND OF THE INVENTION

1. Field of the Invention

The present invention relates to a video signal encoding method and apparatus, and more particularly to a method and apparatus for generating a bounding rectangle of a video object plane (VOP) for interlaced scan type video signals.

2. Description of the Prior Art

Video encoding schemes are classified into a frame-based encoding scheme in which pixels existing in the entire region of a rectangular frame are encoded, and an object-based encoding scheme in which only arbitrary shaped regions of a rectangular frame are encoded. For the frame-based encoding scheme, there are H.261 and H.263, which are vidio coding standards recommended by International Telecommunication Union—Telecommunication Standardization Sector (ITU-T), and MPEG-1 and MPEG-2 standardized by Moving Picture Experts Group (MPEG) of International Standardization Organization/International Electrotechnical Commission Joint Technical Committee 1/Sub Committee 29/Working Group 11 (ISO/IEC JTC1/SC29/WG11). On the other hand, for the object-based encoding scheme, there is MPEG-4 standardized by MPEG of ISO/IEC JTC1/SC29/WG11.

In the object-based encoding scheme, typically, an input video is divided into a plurality of video object planes (VOPs) and processed on the basis of VOP. Each VOP is defined by a bounding rectangle surrounding an arbitrarily shaped object.

Generally, video encoding according to the object-based encoding scheme involves the steps of: extracting luminance shape information from an input video signal and forming VOPs using extracted luminance shape information; and encoding video information of every VOP. The step of encoding video information of every VOP consists of 3 substeps. The 1st substep is encoding shape information of every VOP, based on the extracted luminance shape information. The 2nd substep is subsampling the extracted luminance shape information, thereby extracting chrominance shape information from the extracted luminance shape information, padding a chrominance signal, based on the extracted chrominance shape information, and encoding chrominance of every VOP. And, the 3rd substep is padding a luminance signal, based on the extracted luminance shape information, and encoding luminance of every VOP.

In such a video encoding scheme, a conservative chrominance shape subsampling method has conventionally been used as the subsampling method for extracting chrominance shape information from the extracted luminance shape information. This method is a subsampling method in which chrominance shape information is extracted using four adjacent luminance shape informations defining a rectangle. An example of such a conservative chrominance shape subsampling method is disclosed in Europe Patent No. EP806871 issued to Dae Woo Electronics Co., Ltd. (titled: METHOD AND APPARATUS FOR GENERATING CHROMINANCE SHAPE INFORMATION OF A VIDEO OBJECT PLANE IN A VIDEO SIGNAL).

Meanwhile, MPEG-4 not only supports coding of progressive scan type video signals but also supports coding of interlaced scan type video signals for an application to broadcasting fields, as MPEG-2. In this regard, input video signals for coding and subsampling may be frame type video signals according to a progressive scan scheme in which all signals of one frame of video are simultaneously acquired while being scanned within the same period of time, as shown in FIG. 1a, or may be field type video signals according to an interlaced scan scheme in which signals of one frame of video are sorted into those of a top field and those of a bottom field which are different from each other in terms of the video signal acquisition time, as shown in FIG. 1b.

The above mentioned conventional conservative chrominance shape subsampling method is associated with coding of progressive scan type video signals. Although this method does not involve any problems in association with video signals of the progressive scan scheme, it involves a color bleeding problem in association with video signals of the interlaced scan scheme in which luminance shape information is extracted in an interlaced manner for different fields. This will be described in detail, in conjunction with FIG. 2. In FIG. 2 and following figures, "X" represents luminance shape information, " " represents chrominance shape information, " " represents information belonging to a top field, and " " represents information belonging to a bottom field. Where subsampling of interlaced scan type video signals is carried out for every rectangular subsampling block defined by four adjacent luminance shape informations, based on the luminance shape information, in accordance with the conventional conservative chrominance shape subsampling method, a color bleeding problem occurs because both of chrominance shape information existing in the top field and chrominance shape information existing in the bottom field should be extracted, based on luminance shape information existing in the top field and luminance shape information existing in the bottom field.

In order to solve such a problem, a field-based chrominance shape subsampling method has been proposed which is a subsampling method for interlaced scan type video signals and disclosed in the pending Korean Patent Application No. 98-7374 filed on Mar. 5, 1998 by the applicant. This method is a subsampling method in which chrominance shape information is extracted, based on four adjacent luminance shape informations existing in the same field and defining a rectangle.

However, even though the field-based chrominance shape subsampling method disclosed in the Korean Patent Application No. 98-7374 is applied, extraction of chrominance shape information may be erroneously carried out in such a fashion that, as shown in FIG. 3, chrominance shape information i existing in the bottom field is extracted based on luminance shape information c, d, g, and h existing in the top field while chrominance shape information existing in the top field is extracted based on luminance shape information existing in the bottom field, if bounding rectangles defining a subsampling range of chrominance shape information are erroneously set.

SUMMARY OF THE INVENTION

Therefore, the present invention has been made in view of the above mentioned problem involved in the prior art, and an object of the invention is to provide a method and apparatus for generating a bounding rectangle of a VOP for interlaced scan type video signals, which method and apparatus are capable of accurately generating a bounding rectangle, thereby preventing a color bleeding from occurring in the field-based chrominance shape subsampling.

In accordance with one aspect, the present invention provides a method for generating a bounding rectangle of a video object plane for interlaced scan type video signals comprising: bounding rectangle formation step of forming a bounding rectangle of a video object plane in such a fashion that said bounding rectangle contains an object therein, based on input luminance shape information; optimum setting determination step of determining whether or not a spatial reference point of said bounding rectangle is positioned on an x-y coordinate of coordinate value (2m, 4n) (m and n=0, 1, 2, 3, 4, . . . ); and bounding rectangle adjustment step of varying said bounding rectangle, when it is determined at said optimum setting determination step that said spatial reference point of said bounding rectangle is not positioned on said x-y coordinate of coordinate value (2m, 4n), in such a fashion that said spatial reference point of said bounding rectangle is positioned on said x-y coordinate of coordinate value (2m, 4n).

In accordance with another aspect, the present invention provides an apparatus for generating a bounding rectangle of a video object plane for interlaced scan type video signals comprising: a bounding rectangle formation unit for forming a bounding rectangle of a video object plane in such a fashion that said bounding rectangle contains an object therein, based on input luminance shape information; an optimum setting determination unit for determining whether or not a spatial reference point of said bounding rectangle is positioned on an x-y coordinate of coordinate value (2m, 4n) (m and n=0, 1, 2, 3, 4, . . . ); and a bounding rectangle adjustment unit for varying said bounding rectangle, when said spatial reference point of said bounding rectangle is not positioned on said x-y coordinate of coordinate value (2m, 4n), in such a fashion that said spatial reference point of said bounding rectangle is positioned on said x-y coordinate of coordinate value (2m, 4n).

BRIEF DESCRIPTION OF THE DRAWINGS

Other objects and aspects of the invention will become apparent from the following description of embodiments with reference to the accompanying drawings in which.

DESCRIPTION OF THE PREFERRED EMBODIMENTS

Now, preferred embodiments of a method and apparatus for generating a bounding rectangle of a VOP for interlaced scan type video signals in accordance with the present invention will be described.

First, an example of a video encoder, to which the present invention is applied, will be described.

Figure 4:
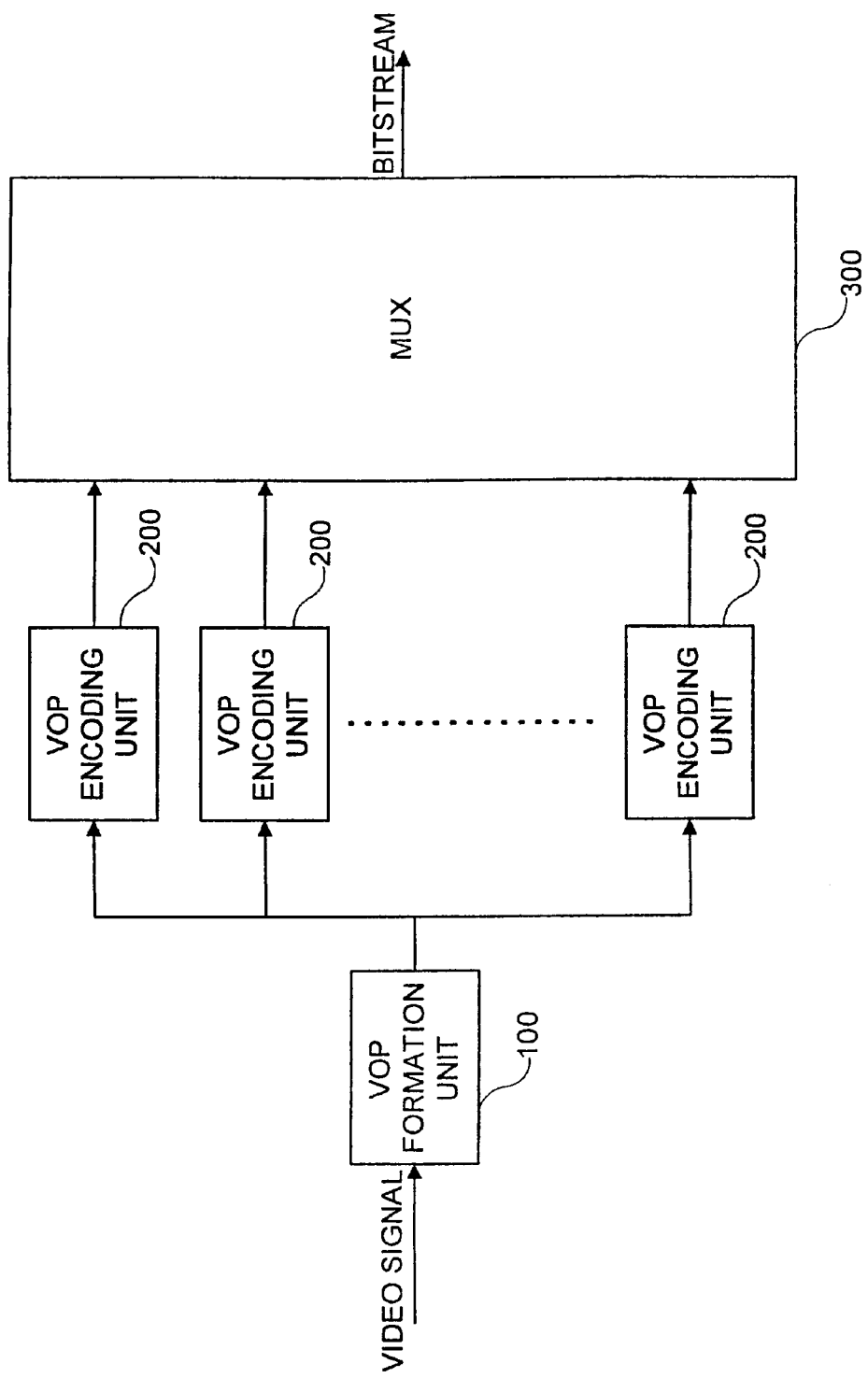
FIG. 4 is a block diagram illustrating the configuration of a video encoder to which the present invention is applied.

Referring to FIG. 4, the video encoder includes a VOP formation unit 100 for deriving luminance shape information from an input video signal, and dividing the input video signal into VOPs respectively corresponding to objects existing in the input video signal, a plurality of VOP encoding unit 200 for receiving output signals, associated with respective VOPs, from the VOP formation unit 100, respectively, and encoding the received signals, respectively, and a multiplexer (MUX) unit 300 for multiplexing output signals from the VOP encoding unit 200, thereby outputting a bitstream.

Figure 1A:
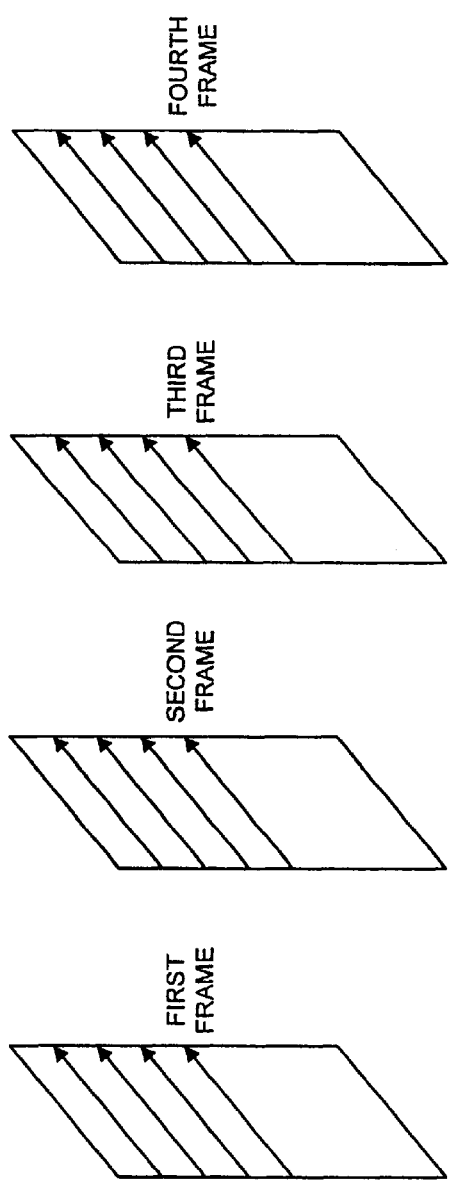
FIG. 1a is a concept diagram for explaining a progressive scan scheme.
Figure 5:
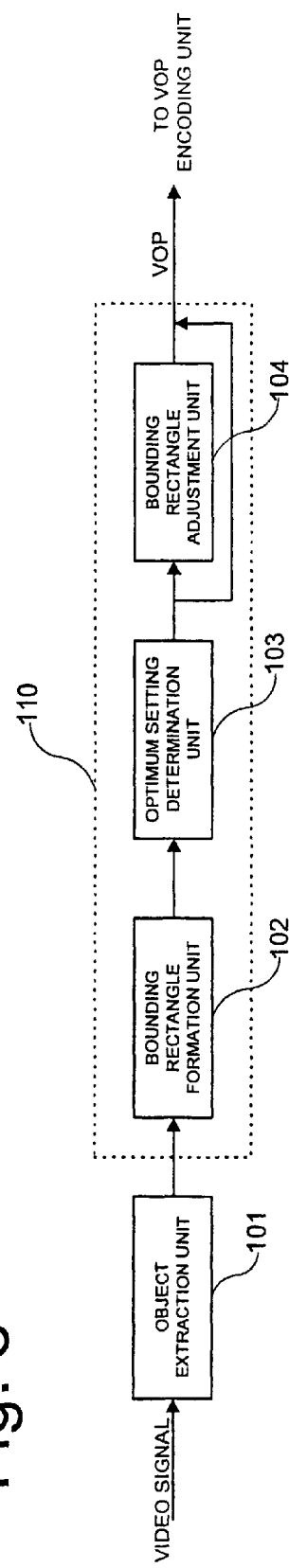
FIG. 5 is a block diagram illustrating the configuration of a VOP formation unit according to the present invention.
Figure 1B:
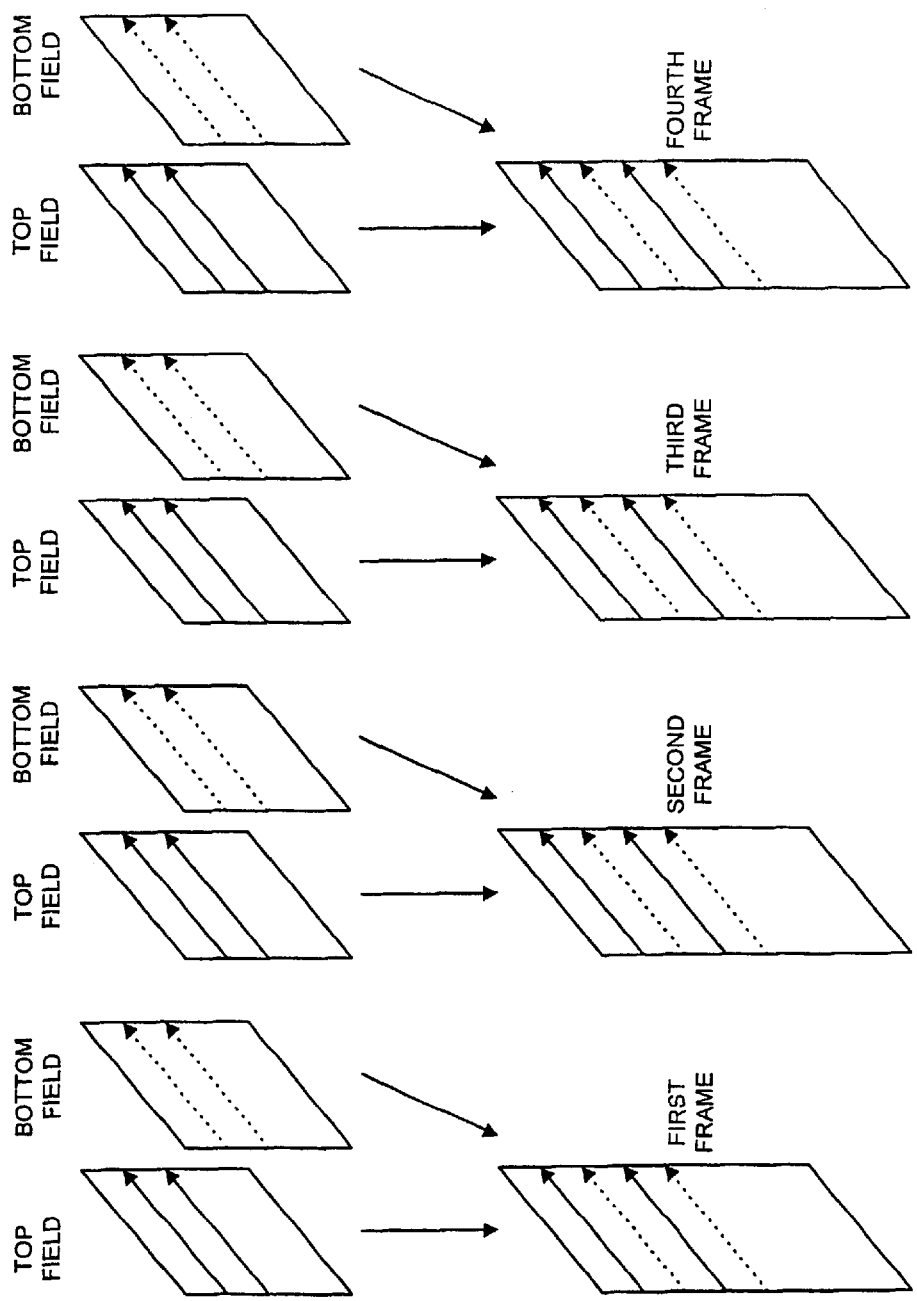
FIG. 1b is a concept diagram for explaining an interlaced scan scheme.
Figure 2:
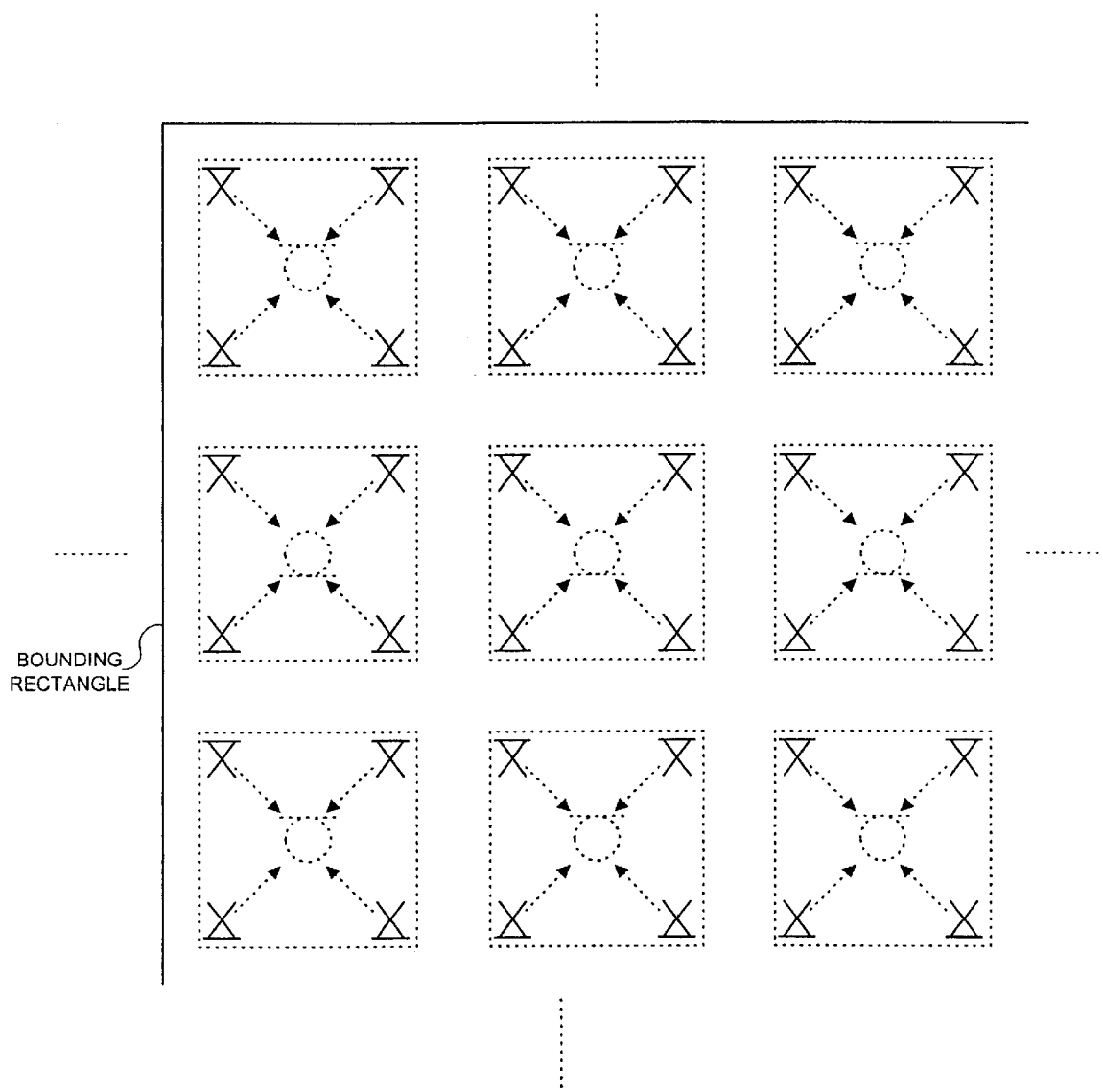
FIG. 2 is a concept diagram for explaining the procedure of extracting chrominance shape information from an interlaced scan type video signal using a conventional conservative chrominance shape subsampling method.
Figure 3:
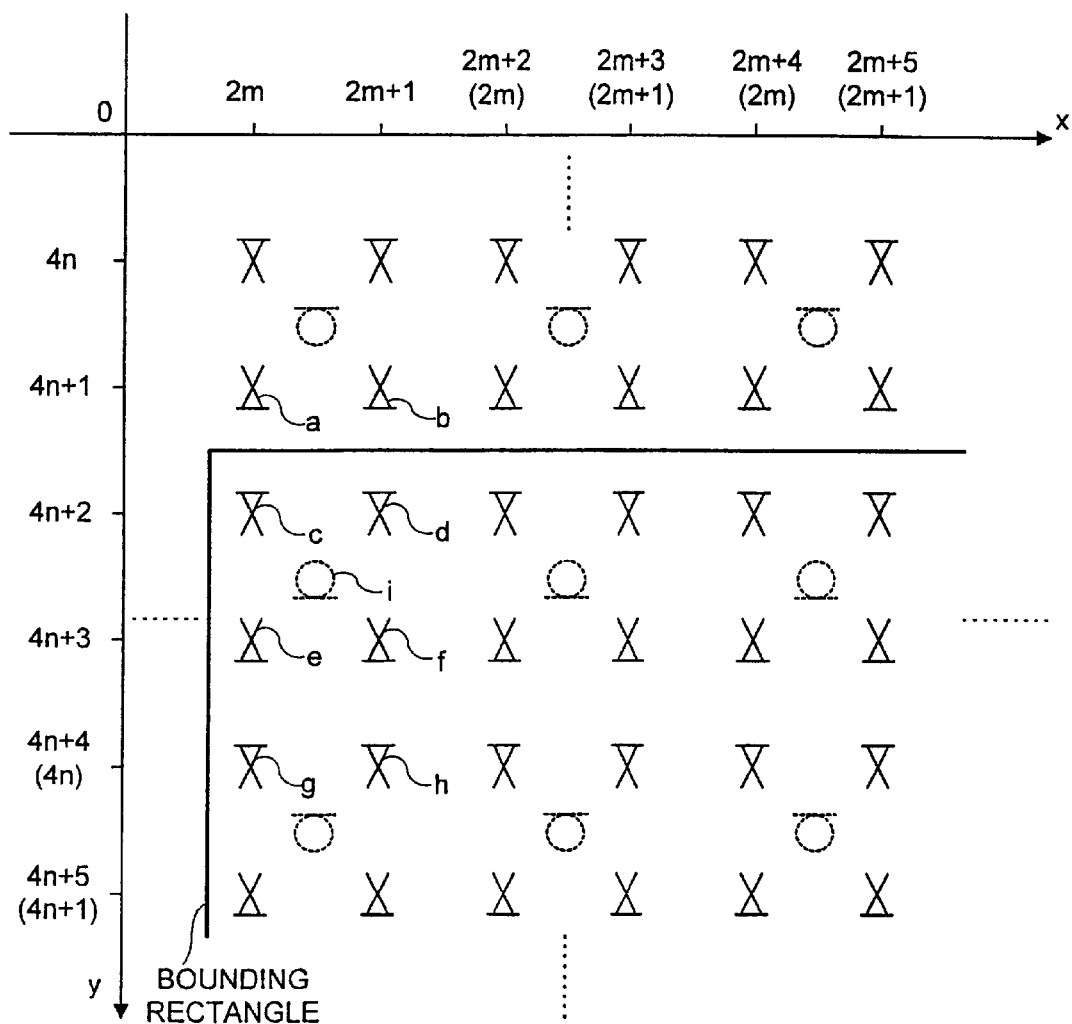
FIG. 3 is a concept diagram for explaining the procedure of extracting chrominance shape information from an interlaced scan type video signal using a field-based chrominance shape subsampling method after an application of a conventional VOP bounding rectangle generating method for interlaced scan type video signals.

Referring to FIG. 5, a detailed configuration of the VOP formation unit 100, which is applicable to the video encoder and configured in accordance with the present invention, is illustrated.

As shown in FIG. 5, the VOP formation unit 100 includes an object extraction unit 101, a bounding rectangle formation unit 102, an optimum setting determination unit 103, and a bounding rectangle adjustment unit 104.

The object extraction unit 101 is a section for extracting luminance shape information from an input video signal by applying a segmentation method to the input video signal.

The bounding rectangle formation unit 102 is a section for forming a bounding rectangle of a VOP in such a fashion that the bounding rectangle contains an object therein, based on the extracted luminance shape information received from the object extraction unit 100. It is preferred that the bounding rectangle formation unit 102 be configured to form the tightest rectangle, namely, a rectangle having the smallest area while containing an object therein, as the bounding rectangle, in order to achieve an enhancement in processing efficiency.

The optimum setting determination unit 103 is a section for determining whether or not a spatial reference point of the bounding rectangle is positioned. on an x-y coordinate of coordinate value (2m, 4n) (m and n=0, 1, 2, 3, 4, . . . ). Here, the spatial reference point means a point where luminance shape information existing on the left-top portion of the interior of the bounding rectangle is positioned. This point is a reference point for the setting of the bounding rectangle.

The bounding rectangle adjustment unit 104 is a section for varying the bounding rectangle when the spatial reference point of the bounding rectangle is not positioned on the x-y coordinate of coordinate value (2m, 4n), thereby allowing the spatial reference point of the bounding rectangle to be positioned on the x-y coordinate of coordinate value (2m, 4n). Since the region to be encoded should be minimized in order to obtain a maximum encoding efficiency, it is preferred that the bounding rectangle adjustment unit 104 be configured to vary the bounding rectangle, when the spatial reference point of the bounding rectangle is not positioned on the x-y coordinate of coordinate value (2m, 4n), in such a fashion that the spatial reference point of the bounding rectangle is positioned on an x-y coordinate of the coordinate value (2m, 4n) minimizing the interior area of the bounding rectangle.

The bounding rectangle formation unit 102, the optimum setting determination unit 103, and the bounding rectangle adjustment unit compose an apparatus for generating a bounding rectangle of a VOP for interlaced scan type video signals. In the following description, accordingly, they will be referred to as an apparatus for generating a bounding rectangle of a VOP for interlaced scan type video signals.

Figure 6:
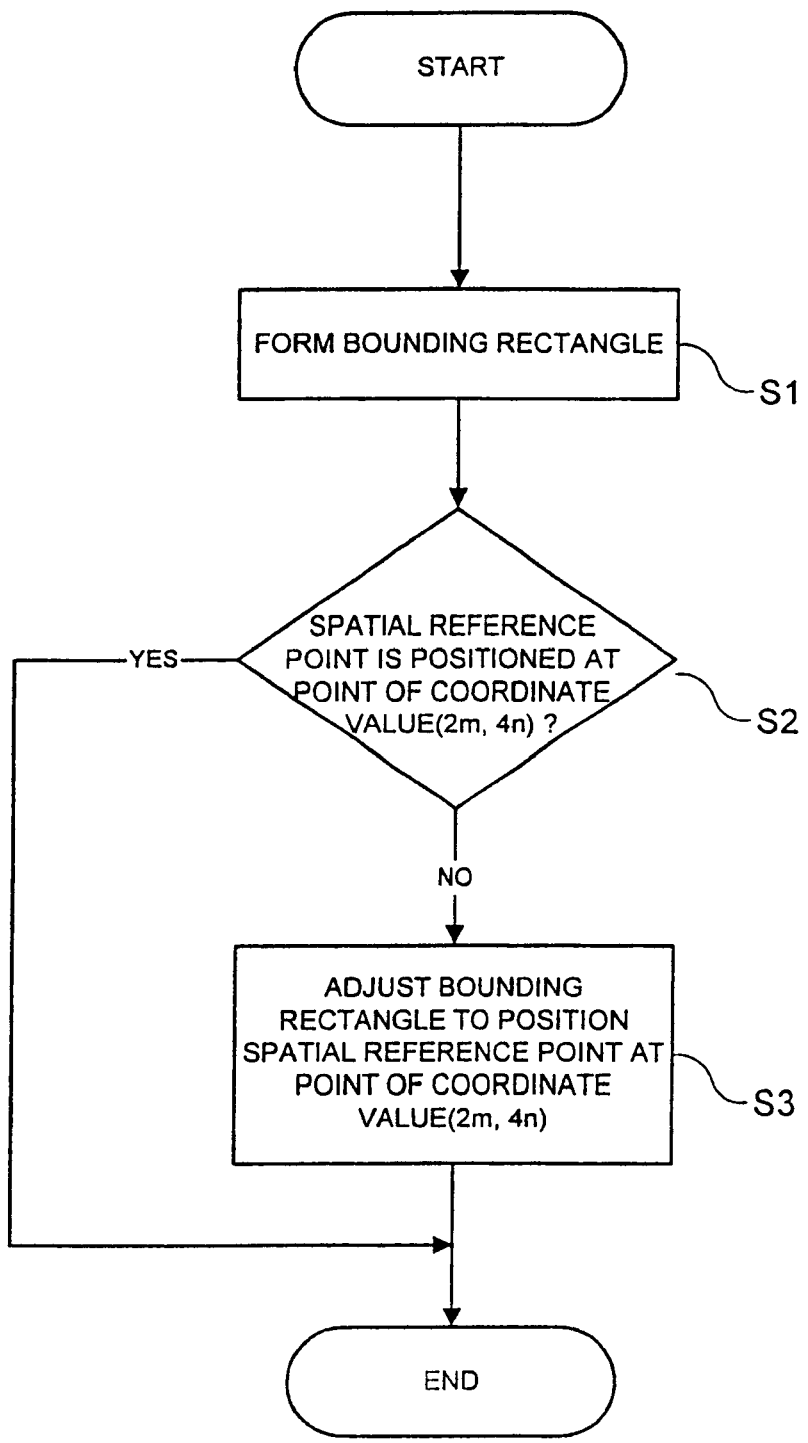
FIG. 6 is a flow chart illustrating a method for generating a bounding rectangle of a VOP for interlaced scan type video signals.

Now, a method for generating a bounding rectangle of a VOP for interlaced scan type video signals, which can be embodied using the apparatus for generating a bounding rectangle of a VOP for interlaced scan type video signals in accordance with the present invention, will be described in conjunction with FIG. 6.

In accordance with the method, a bounding rectangle formation step S1 is first executed in the bounding rectangle forming unit 102. At the bounding rectangle formation step S1, the bounding rectangle forming unit 102 sets a bounding rectangle, in such a fashion that the bounding rectangle contains an object therein, based on the extracted luminance shape information received from the object extraction unit 100. Preferably, the bounding rectangle formation step S1 is executed to form the tightest rectangle as the bounding rectangle in order to achieve an enhancement in processing efficiency.

Thereafter, an optimum setting determination step S2 is executed in the optimum setting determination unit 103. At the optimum setting determination step S2, it is determined whether or not a spatial reference point of the bounding rectangle is positioned on an x-y coordinate of coordinate value (2m, 4n).

Finally, a bounding rectangle adjustment step S3 is executed in the bounding rectangle adjustment unit 104 when it is determined at the optimum setting determination step S2 that the spatial reference point of the bounding rectangle is not positioned on the x-y coordinate of coordinate value (2m, 4n). At the bounding rectangle adjustment step S3, the bounding rectangle adjustment unit 104 varies the bounding rectangle in such a fashion that the spatial reference point of the bounding rectangle is positioned on the x-y coordinate of coordinate value (2m, 4n). Since the region to be encoded should be minimized in order to obtain a maximum encoding efficiency, the bounding rectangle adjustment step S3 is preferably executed to vary the bounding rectangle, when the spatial reference point of the bounding rectangle is not positioned on the x-y coordinate of coordinate value (2m, 4n), in such a fashion that the spatial reference point of the bounding rectangle is positioned on an x-y coordinate of the coordinate value (2m, 4n) minimizing the interior area of the bounding rectangle.

Figure 7:
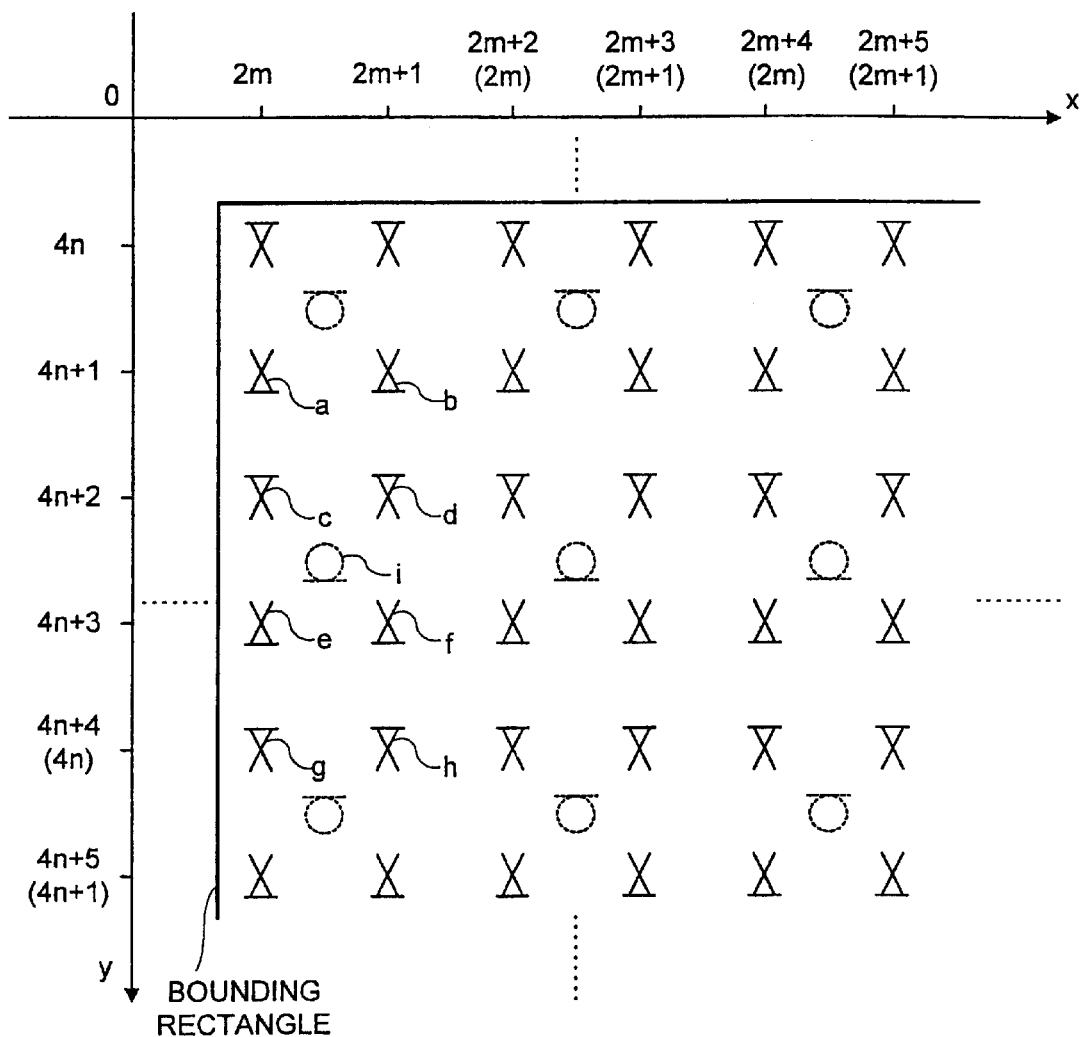
FIG. 7 is a concept diagram for explaining the procedure of extracting chrominance shape information from an interlaced scan type video signal using a field-based chrominance shape subsampling method after an application of a VOP bounding rectangle generating method for interlaced scan type video signals in accordance with the present invention.

As apparent from the above description, the present invention provides a method and apparatus for generating a bounding rectangle of a VOP for interlaced scan type video signals, which are capable of accurately generating a bounding rectangle, thereby preventing a color bleeding from occurring in the field-based chrominance shape subsampling. Where a VOP is defined based on a bounding rectangle appropriately set in accordance with the present invention, extraction of chrominance shape information may be correctly carried out in such a fashion that, as shown in FIG. 7, chrominance shape information i existing in the bottom field is extracted based on luminance shape information a, b, e, and f existing in the bottom field whereas chrominance shape information existing in the top field is extracted based on luminance shape information existing in the top field. Accordingly, it is possible to completely solve the color bleeding problem.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A method for generating a bounding rectangle of a video object plane for interlaced scan type video signals comprising:

bounding rectangle formation step of forming a bounding rectangle of a video object plane in such a fashion that said bounding rectangle contains an object therein, based on input luminance shape information;

optimum setting determination step of determining whether or not a spatial reference point of said bounding rectangle is positioned on an x-y coordinate of coordinate value (2m, 4n) (m and n=0, 1, 2, 3, 4, . . . ); and bounding rectangle adjustment step of varying said bounding rectangle, when it is determined at said optimum setting determination step that said spatial reference point of said bounding rectangle is not positioned on said x-y coordinate of coordinate value (2m, 4n), in such a fashion that said spatial reference point of said bounding rectangle is positioned on said x-y coordinate of coordinate value (2m, 4n).

2. The method in accordance with claim 1, wherein said bounding rectangle adjustment step is executed to vary said bounding rectangle, when said spatial reference point of said bounding rectangle is not positioned on said x-y coordinate of coordinate value (2m, 4n), in such a fashion that the spatial reference point of the bounding rectangle is positioned on an x-y coordinate of the coordinate value (2m, 4n) minimizing the interior area of said bounding rectangle.

3. The method in accordance with claim 1, wherein:

said bounding rectangle formation step is executed to form the tightest rectangle as said bounding rectangle; and said bounding rectangle adjustment step is executed to vary said bounding rectangle, when said spatial reference point of said bounding rectangle is not positioned on said x-y coordinate of coordinate value (2m, 4n), in such a fashion that the spatial reference point of the bounding rectangle is positioned on an x-y coordinate of the coordinate value (2m, 4n) minimizing the interior area of said bounding rectangle.

4. An apparatus for generating a bounding rectangle of a video object plane for interlaced scan type video signals comprising:

a bounding rectangle formation unit for forming a bounding rectangle of a video object plane in such a fashion that said bounding rectangle contains an object therein, based on input luminance shape information;

an optimum setting determination unit for determining whether or not a spatial reference point of said bounding rectangle is positioned on an x-y coordinate of coordinate value (2m, 4n) (m and n=0, 1, 2, 3, 4, . . . ); and a bounding rectangle adjustment unit for varying said bounding rectangle, when said spatial reference point of said bounding rectangle is not positioned on said x-y coordinate of coordinate value (2m, 4n), in such a fashion that said spatial reference point of said bounding rectangle is positioned on said x-y coordinate of coordinate value (2m, 4n).

5. The apparatus in accordance with claim 4, wherein said bounding rectangle adjustment unit varies said bounding rectangle, when said spatial reference point of said bounding rectangle is not positioned on said x-y coordinate of coordinate value (2m, 4n), in such a fashion that the spatial reference point of the bounding rectangle is positioned on an x-y coordinate of the coordinate value (2m, 4n) minimizing the interior area of said bounding rectangle.

6. The apparatus in accordance with claim 4, wherein:

said bounding rectangle formation unit forms the tightest rectangle as said bounding rectangle; and said bounding rectangle adjustment unit varies said bounding rectangle, when said spatial reference point of said bounding rectangle is not positioned on said x-y coordinate of coordinate value (2m, 4n), in such a fashion that the spatial reference point of the bounding rectangle is positioned on an x-y coordinate of the coordinate value (2m, 4n) minimizing the interior area of said bounding rectangle.

7. A method for generating a bounding rectangle of a video object plane for interlaced scan type video signals so as to eliminate a color bleeding problem in said video signals, said method comprising:

bounding rectangle formation step of forming a bounding rectangle of a video object plane in such a fashion that said bounding rectangle contains an object therein, based on input luminance shape information;

optimum setting determination step of determining whether or not a spatial reference point of said bounding rectangle is positioned on an x-y coordinate of coordinate value (2m, 4n) (m and n=0, 1, 2, 3, 4, . . . );

bounding rectangle adjustment step of varying said bounding rectangle, when it is determined at said optimum setting determination step that said spatial reference point of said bounding rectangle is not positioned on said x-y coordinate of coordinate value (2m, 4n), in such a fashion that said spatial reference point of said bounding rectangle is positioned on said x-y coordinate of coordinate value (2m, 4n); and outputting said video signals with said color bleeding problem eliminated through said optimum setting determination step and said bounding rectangle adjustment step;

wherein said bounding rectangle adjustment step is performed whenever it is determined at said optimum setting determination step that said spatial reference point of said bounding rectangle is positioned on an x-y coordinate whose y coordinate is 4n+2 or is otherwise not positioned on said x-y coordinate of coordinate value (2m, 4n).

* * * * *